United States Patent
McAtamney

(10) Patent No.: US 8,533,690 B2
(45) Date of Patent: Sep. 10, 2013

(54) C-TO-JAVA PROGRAMMING LANGUAGE TRANSLATOR

(76) Inventor: James B. McAtamney, Falls Church, VA (US)

( * ) Notice: Subject to any disclaimer, the term of this patent is extended or adjusted under 35 U.S.C. 154(b) by 538 days.

(21) Appl. No.: 12/784,277

(22) Filed: May 20, 2010

(65) Prior Publication Data
US 2011/0289490 A1   Nov. 24, 2011

(51) Int. Cl.
G06F 9/44 (2006.01)
G06F 9/45 (2006.01)

(52) U.S. Cl.
USPC .......................................... 717/137; 717/141

(58) Field of Classification Search
None
See application file for complete search history.

(56) References Cited

U.S. PATENT DOCUMENTS

| | | | |
|---|---|---|---|
| 2006/0248519 A1* | 11/2006 | Jaeger et al. | 717/141 |
| 2009/0019430 A1* | 1/2009 | Jaeger et al. | 717/141 |
| 2009/0313613 A1* | 12/2009 | Ben-Artzi et al. | 717/137 |

* cited by examiner

Primary Examiner — Hyun Nam
(74) Attorney, Agent, or Firm — Dennis H. Lambert

(57) ABSTRACT

A C-to-Java programming language translator that requires no human intervention, translates literally to preserve both procedure and function in the resulting code, and is independent of the purpose of the source code. The program reads in text from a C file, tokenizes each line for C keywords and punctuation, translates most keywords and expressions, and outputs the result to a Java file. The program is modular so that it is capable of running on multiple operating systems and hardware. The invention implements several methods of translation, including whole-line translation, search/replace translation, context-sensitive translation, idiomatic translation, and second-pass translation. The second-pass translation handles those instances when correct translation of a particular line depends on information in another line. The program of the invention translates a struct into a Java inner class, complete with multiple constructors and private variables, and it translates pointers into their reference equivalents.

15 Claims, 11 Drawing Sheets

```
#include <stdio.h>
#include <stdlib.h>
include <math.h> define N 51 double oldArray[N*N], newArray[N*N];
int nb, minX, minY, maxY;
double top[N], bottom[N], left[N], right[N];

int neighbors(int x)
{
        nb=0;
        if(x%N!=0 && x-N-1>0 && oldArray[x-N-1]==1.0)
                nb++;
        if(x-N>0 && oldArray[x-N]==1.0)
                nb++;
        if((x+1)%N!=0 && x-N+1>0 && oldArray[x-N+1]==1.0)
                nb++;
        if(x%n!=0 && x-1>0 && oldArray[x-1]==1.0)
                nb++;
        if(x%n!=0 && x-N-1>0 && oldArray[x-N-1]==1.0)
                nb++;
        if((x+1)%N!=0 && x+N<N*N && oldArray[x+1]==1.0)
                nb++;
```

FIG. 3

```
import java.io.*;
import java.lang.*;
import java.util.*;
public class GameOfLife
{
        final static int N=51;
        static double[] oldArray=new double[N*N];
        static double[] newArray=new double[N*N];
        static int nb,minX,maxX,minY,maxY;
        static double[] top=new double[N];
        static double[] bottom=new double[N];
        static double[] left=new double[N];
        static double[] right=new double[N];
        public static int neighbors(int x)
        {
                nb=0;
                if(x%N!=0 && x-N-1>0 && oldArray[x-N-1]==1.0)
                        nb++;
                if(x-N>0 oldArray[x-N]==1.0)
                        nb++;
                if((x+1)%N!=0 && x-N+1>0 && oldArray[x-N+1]==1.0)
                        a++;
                if(x%N!=0 && x-1>0 && oldArray[x-1]==1.0)
```

FIG. 4

```
                                    printf(" ");
                        z++;
                }
                printf("|\n");
        }
        printf("\n");
} int main(int argc,char* argv[])
{
        int z;
        for(z=0;z<N*N;z++)
                if(((float)(rand())/RAND_MAX)<0.5)
                        oldArray[z]=1.0;
        while(1)
        {
                print();
                char c=getchar();
                update();
        }
        return 0;
}
```

FIG. 5

```
                                System.out.print("X");
                    else
                                System.out.print(" ");
                    z++;
                }
                System.out.print("|");
            }
            System.out.print("");
        }
        public static void main(String[] args) throws IOException
        {
            int z;
            for(z=0;z<N*N;z++)
                    if(((double)(Math.random())/1)<0.5)
                            oldArray[z]=1.0;
            while(true)
            {
                    print();
                    char c=(char)(System.in.read());
                    update();
            }
        }
}
```

FIG. 6

```c
#include <stdio.h>
#include <stdlib.h>
include <math.h> define N 51 double oldArray[N*N],newArray[N*N];
int nb,minX,maxX,minY,maxY;
double top[N],bottom[N],left[N],right[N];

int neighbors(int x)
{
nb=0;
if(x%N!=0 && x-N-1>0 && oldArray[x-N-1]=1.0)
nb++;
if(x-N>0 && oldArray[x-N]=1.0)
nb++;
if((x+1)%N!=0 && x-N+1>0 && oldArray[x-N+1]=1.0)
nb++;
if(x%N!=0 && x-1>0 && oldArray[x-1]=1.0)
nb++;
if((x+1)%N!=0 && x+1<N*N && oldArray[x+1]=1.0)
nb++;
```

FIG. 7

```
printf(" ");
z++;
}
printf("|\n");
}
printf("\n");
} int main(int argc,char* argv[])
{
int z;
for(z=0;z<VN;z++)
if(((float)(rand())/RAND_MAX)<0.5)
olddArray[z]=1.0;
while(1)
{
print();
char c=getchar();
update();
}
return 0;
}
```

FIG. 8

```
import java.io.*;
import java.lang.*;
import java.util.*;

public class Intermediate
{
final static int N=51;
static double[] oldArray=new double[N*N];
static double[] newArray=new double[N*N];

static int nb,minX,maxX,minY,maxY;
static double[] top=new double[N];
static double[] bottom=new double[N];
static double[] left=new double[N];
static double[] right=new double[N];

public static int neighbors(int x)
{
nb=0;
if(x%N!=0 && x-N-1>0 && oldArray[x-N-1]=1.0)
nb++;
if(x-N>0 && oldArray[x-N]==1.0)
nb++;
```

FIG. 9

```
else
System.out.print(" ");
z++;
}
System.out.println("|");
}
System.out.println("");
public static void main(String[] args)
{
int z;
for(z=0;z<N*N;z++)
if(((double)(Math.random())/1)<0.5)
oldArray[z]=1.0;
while(true)
{
print();
char c=(char)(System.in.read());
update();
}
}

```
import java.io.*;
import java.lang.*;
import java.util.*;
public class GameOfLife
{
final static int N=51;
static double[] oldArray=new double[N*N];
static double[] newArray=new double[N*N];
static int nb,minX,maxX,minY,maxY;
static double[] top=new double[N];
static double[] bottom=new double[N];
static double[] left=new double[N];
static double[] right=new double[N];
public static int neighbors(int x)
{
nb=0;
if(x%N!=0 && x-N-1>0 && oldArray[x-N-1]==1.0)
nb++;
if(x-N>0 && oldArray[x-N]==1.0)
nb++;
if((x+1)%N!=0 && x-N-1-1>0 && oldArray[x-N+1]==1.0)
nb++;
if(x%N!=0 && x-1>0 && oldArray[x-1]==1.0)
```

FIG. 11

```
System.out.print("X");
else
System.out.print(" ");
z++;
}
System.out.println("|");
}
System.out.println("");
}
public static void main(String[] args) throws IOException
{
int z;
for(z=0;z<N*N;z++)
if(((double)(Math.random())/1)<0.5)
oldArray[z]=1.0;
while (true)
{
print();
char c=(char)(System.in.read());
update();
}
}
}
```

FIG. 12

C-TO-JAVA PROGRAMMING LANGUAGE TRANSLATOR

TECHNICAL FIELD

The present invention relates to programming language translators, and more particularly to a programming language translator that translates C programming language into Java.

BACKGROUND ART

With the modern emphasis on program portability and the new need to run programs on multiple computers in networks or over the Internet, it would be very useful for C programmers to be able to translate either legacy or newly-written C programs into Java to make them more portable. However, translation by hand is too tedious and time-consuming, while previously available computer algorithms to do so are not very accurate and/or require human intervention.

Both the C programming language and the Java programming language are versatile, powerful, and popular among programmers. C is commonly used when creating operating systems, network interfaces, and other programs which require the ability to manipulate memory usage, binary data, and similar low-level constructs. Java has two major advantages over C, however. The first is its modularity, as it is capable of being used on any platform and any operating system, while implementations of C are platform-specific and must be recompiled or sometimes rewritten when moved from one computer to another. The second is the fact that coding in Java is easier for the programmer than coding in C, as details such as memory usage and data size are not handled by the programmer but by the Java Virtual Machine. For these reasons, translation of programs from C into Java are most beneficial when programs are required to run under different operating systems or machine specifications, when a less-experienced programmer needs to modify a program originally written in C, or a combination of the two, though these are by no means the only scenarios under which translation would be beneficial.

Shifting from the programmer's perspective to a consideration of program functionality, there are three major groups of programs that benefit from translation from C to Java. First are "legacy" programs that were originally written in C to take advantage of its higher execution speed. However, as modern computers have more memory and run faster than those of even a few years ago, these "legacy" programs would gain more from added portability than they would from remaining in C. Second are programs wherein the majority of the code implements simple algorithms such as string tokenization, data storage and manipulation, and the like. Java already has several implementations of algorithms such as these built into it, so code could be simplified and shortened. Third are programs that will be used either over a network or the Internet. While C has methods for sending and receiving information between different computers, any programs that require a user interface on the other end of transmissions would benefit greatly from Java's portability and its already-implemented applet system.

While the differences among programming languages have been studied extensively in comparative languages courses and otherwise, little progress has been made in the area of automated programming language translation. One company, Jazillian, Inc., provides translations among a limited number of languages for a fee, but significant client involvement is required to tailor the algorithm to the program's intended use.

The "Jazillian" conversion software is capable of incorporating C header files into multiple class files, renaming files, and making other alterations when multiple files are involved, but those functions require human intervention to set up naming conventions, alter code used to include methods from other classes, and make minor corrections in the translated code. In addition, some of the more complex translation cases are handled by Jazillian-created classes used by the new code, meaning that the client and anyone else wishing to use the resulting Java code must be able to access those classes, which defeats Java's purpose of being able to run equally on any platform with standard Java specifications, and thus partially defeating the purpose of translation in the first place.

The problems involved with automated translation occur because programming languages are too dissimilar for direct word-for-word translation. For example, Python and Ruby, open-source programming languages by Python Software Foundation and Yukihiro Matsumoto, respectively, do not declare variables and use indentation instead of braces, "(" and "}", to denote blocks of text, in comparison to the C and Java methods of declaring variables and separating code.

The "C2J" conversion software offered by Novosoft LLC is another very accurate C to Java translator, but it suffers from two major flaws. First, one of its stated goals is to exactly duplicate the function of the original C code, which causes it to attempt to use precisely the same memory requirements and execute code in precisely the same way in Java as in C, even when Java's native memory handling is superior and when there are already Java methods implemented to perform the same function as the C code. This causes the translated code to be less efficient and more memory-intensive than the same Java program written in Java originally, and where many procedures could be handled by a single line of Java code, many additional lines are used to duplicate C functionality. Its second flaw is human readability. Between the facts that it attempts to function identically to C and thus requires a great deal of additional code for memory management and duplication of C procedures and that it changes many names to fit C2J's naming conventions, the resulting code will execute perfectly but is practically incomprehensible to a human programmer who would wish to modify the code, which once again defeats the purpose of translation.

Other examples of programming language translators are described in U.S. Pat. Nos. 6,453,464 and 7,213,216.

The U.S. Pat. No. 6,453,464 describes a COBOL to Java translator wherein source language primitive functions are represented by archetypal templates having code that is selectable based upon the applicable case. This basically means that COBOL methods are generalized to a group of templates before conversion, such as several functions that read data from files being collectively described by two or three "generic file input" templates. Then, since it is "selectable based on the application case," one can assume that the translation algorithm requires human input to determine which of the possible functions or classes representing the COBOL code fits best for the purpose for which the original code was intended. This algorithm would thus have two significant differences from the present invention, and potential weaknesses, were it applied to C to Java translation. First, once the Java templates are assigned, the translator requires human intervention to choose the best one. This implies that the translator does not perform a literal translation, but only a functional one (translating code so it does the same thing, but not necessarily the same way), which can cause problems if the code relies on an idiosyncrasy of C to do its task. Second, the translator has to assign templates. If the C code does not have a readily-discovered purpose (which is very possible, given C's ability to directly manipulate memory without using easily-classified methods) then the algorithm simply would not work.

U.S. Pat. No. 7,213,216 describes a .NET to Java translator that starts with " . . . a first step of receiving metadata information from a .Net Remoting server on a Java client. Then, Java proxies are generated from said metadata information, using a Java development tool, with the Java proxies generated by a one-to-one mapping of .Net classes to Java classes." This basically means that the .NET code is not actually being translated, but rather Java classes are being generated that perform the same functions as the .NET classes—metadata is information about a program rather than the source code itself, so what this essentially does is recognize that a given method is tagged with the "file input" tag (for example) and output a Java file input method rather than manipulating the .NET code. In addition, it maps .NET classes to Java classes, meaning that both languages are object-oriented (like Java) rather than .NET being procedural (like C). Thus, this algorithm could not be applied to C to Java translation.

Even syntactically similar languages such as C and Java have differences that make simple search-and-replace difficult. For example, while the C "char" arrays have an analog in Java Strings, because they are two different data structures the methods for accessing them are very different, and this discrepancy must be taken into account. A related difficulty is C's use of pointers. A "string" in C is not simply an array of "chars", it is a pointer to an array of "chars", expressed as "char*", which means that string comparison methods, string search methods, and the like are required. One cannot simply copy, compare, or otherwise manipulate strings in the same way one may manipulate "ints" or "chars".

It would be advantageous to have a translator for converting C programming language to Java without requiring human intervention, that translates literally to preserve both procedure and function in the resulting code, and that is independent of the purpose of the source code.

DISCLOSURE OF THE INVENTION

The present invention is automated and accurate conversion software for converting C programming language to Java language. The translation program of the invention requires no human intervention, translates literally to preserve both procedure and function in the resulting code, and is independent of the purpose of the source code.

The program of the invention reads in text from a C file, tokenizes each line for C keywords and punctuation, translates most keywords and expressions, and outputs the result to a Java file.

The translation program is meant to be modular so that it is capable of running on multiple operating systems and hardware. The program may be stored and accessed in a variety of ways. For instance, the translation programs themselves may either be compiled directly from the source code before translation or stored solely as machine code after compilation, so it supports storage in both text-based (human readable) and purely binary formats. When accessing C files to be translated, and writing the resulting Java files, the translator makes use of standard Java file input/output commands, and so may be used without alteration on any machine with a Java Runtime Environment (JRE) installed. Thus, while it is possible to integrate the translator at any level of computer processes that can support the Java JRE, it is meant to be usable with any machine-readable media (such as a CD, flash-memory device, or other portable medium) and loaded to run when necessary.

Several translation modules have been implemented, each of which handles specific aspects of the program to be translated so as to compartmentalize the translation process as much as possible:

Translates primitive types—basic representations of data, such as text or numbers.

Translates C preprocessor directives
  C "include" to Java "import," which both involve use of methods and programs previously defined so as to not to have to re-write code in the program in question.
  C "define" to Java variable declaration, which both involve setting variable values which will be used throughout the program to make later alteration of these values easier.

Translates C array declarations to Java array constructors—arrays are sets of similar data (several numbers, several strings of text, etc.) placed in the same block of memory, and they are treated differently in the two languages.

Translates input and output methods—functions used to write information to a file or retrieve information from files or user input devices.

Translates input and output structures such as input/output streams and files—representations within the program of files, keyboard input, mouse input, and so on.

Translates method and module headers—names of subroutines within code that are called by these names rather than being rewritten each time they are used.

Translates most common package methods, including but not limited to: math.h, string.h, stdlib.h, stdio.h—methods from modules containing previously-written code (such as mathematical functions in math.h, text manipulation in string.h, etc.)

Can throw Exceptions—error messages that either alert the user that there is an error or allow the program to attempt an alternate action when an error occurs.

Translates C structs to Java inner classes—these are different ways to represent collections of data and methods so as to improve modularization and readability of code.

Translates basic graphics from OpenGL to JOGL—The Open Graphics Library (OpenGL) is the primary graphics engine in C, and its counterpart JOGL (the Java Open Graphics Library) is the primary graphics engine in Java.

The invention also implements several methods of translation. In order of increasing level of complexity, they are: whole-line translation, search/replace translation, context-sensitive translation, idiomatic translation, and second-pass translation.

The first step, whole-line translation, is very simple: If there is a particular line of code or method in C that always has the same syntax in Java, it can be translated before the line is tokenized. For example, in C the main line is always either "int main(int argc, char*argsv[ ])" or simply "int main( )", and in Java it is always "public static void main(String[ ] args)", so if the input line is the main line, the Java main line can be printed immediately and then move on in the translation process, thereby speeding up the translation of many common methods and data structures used in both languages.

The second step, search/replace translation, is similarly easy: Everywhere a C keyword or set of keywords is seen that has an exact synonym in Java, the entire phrase is simply replaced with the corresponding Java phrase. For example, the equivalent of a Java String is represented in C by "char*", so whenever "char*" appears in C code the translator simply replaces it with "String".

The next several methods are more complex. Context-sensitive translation handles Java methods that are just slightly different in C. The most common example is output methods. In Java, there are "println( )" methods that will output a newline character, which moves the cursor to the next line, after printing the argument, in the same way a user would type text into a word processor and then hit "enter" to move to the next line; however, there is no such method in C. Therefore, whenever an output method in C prints a newline character as part of the argument, the translator removes that character from the output string and replaces the C method with "println( )" instead of "print( )".

Idiomatic translation is somewhat similar, in that it is used when there are minor variations between C and Java syntax. This is used when the C syntax would technically work, but more "natural" Java would use a different command and may possibly work better with the Java compiler. For example, in C there is no equivalent to a Boolean (true/false) variable type, so integer values of 1 and 0 are used instead. While using this convention will work in Java, it is more "idiomatically correct" to use "true" and "false" instead of "1" and "0", so when the translator reads in a line containing, say, "while(1)", it will translate this to "while(true)".

Finally, second-pass translation handles those instances when translation of a particular line correctly depends on information in another line. For example, in Java a program must throw or handle a "FileNotFoundException" if an input method tries to access a file that doesn't exist. This must be handled at the end of the method header ("public void method( ) throws Exception"). Since the translator won't know to throw an exception until and unless it reads in an input method later in the program, the invention uses a second program to handle two-pass translation, reading in lines to be translated with a primary Scanner while a secondary Scanner searches for input methods, instances of method names, or whatever else is necessary to translate two-pass statements.

The program of the invention translates a struct into a Java inner class, complete with multiple constructors and private variables, and it translates pointers into their reference equivalents. Because pointers (data structures directly accessing memory locations) are not implemented in Java for various reasons of security and ease-of-use, any use of them in a C program must be translated to the equivalent statement using a reference, i.e., a call by variable name that the Java virtual machine will handle and interpret as an internal pointer if necessary. Because the structure of C structs requires the use of pointers in its implementations, even structs that could possibly be represented as normal C code must be translated to a Java class, which again requires translation of pointers to references.

BRIEF DESCRIPTION OF THE DRAWINGS

The foregoing, as well as other objects and advantages of the invention, will become apparent from the following detailed description when taken in conjunction with the accompanying drawings, wherein like reference characters designate like parts throughout the several views, and wherein:

FIG. 3 shows the first few lines of a C program, before translation.

FIG. 4 shows the first few lines of a corresponding Java program, after translation.

FIG. 5 shows the last few lines of a C program, before translation.

FIG. 6 shows the last few lines of a corresponding Java program, after translation.

FIG. 7 shows the first few lines after "Remove_Spaces" and before "C_to_Java_Translator".

FIG. 8 shows the last few lines after "Remove_Spaces" and before "C_to_Java_Translator".

FIG. 9 shows the first few lines after "C_to_Java_Translator" and before "Second_Traverse".

FIG. 10 shows the last few lines after "C_to_Java_Translator" and before "Second_Traverse".

FIG. 11 shows the first few lines after "Second_Traverse" and before "Add_Spaces".

FIG. 12 shows the last few lines after "Second_Traverse" and before "Add_Spaces".

DETAILED DESCRIPTION OF THE PREFERRED EMBODIMENTS

Figure 1:
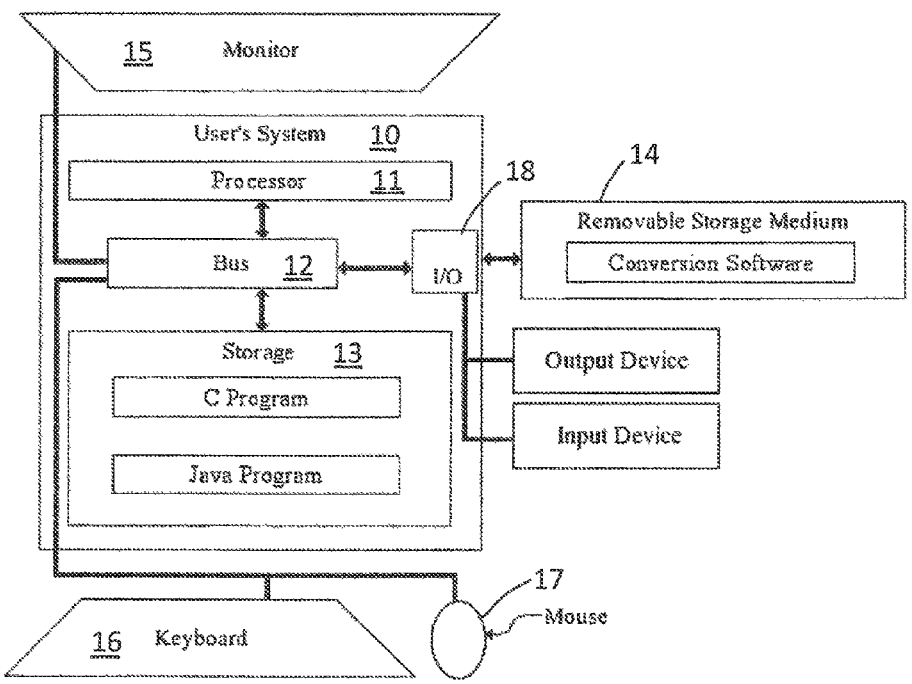
FIG. 1 illustrates a block diagram of a computer system that may be used to implement embodiments of the invention.

A computer system for implementing an embodiment of the invention is indicated generally at 10 in FIG. 1. It should be understood that the architecture of FIG. 1 is provided only for purposes of illustration, and a computer or other processor or any computer readable medium may be used in conjunction with embodiments of the invention. As shown, the system includes a processor 11 coupled through a bus 12 to memory 13 and to a mass storage device 14. Mass storage device 14 represents a persistent data storage device, such as a floppy disk drive, fixed disk drive (e.g. magnetic, optical, magneto-optical, or the like), or streaming tape drive. Processor 11 may be embodied in a general purpose processor, a special purpose processor, or a specifically programmed logic device. Display device 15 is coupled to processor 11 through bus 12 and provides graphical output for computer system 10. Keyboard 16 and cursor control unit 17 are coupled to bus 12 for communicating information and command selections to processor 11. Also coupled to processor 11 through bus 12 is an input/output (I/O) interface 18, which can be used to control and transfer data to electronic devices (printers, other computers, etc.) connected to computer system 10.

As will be appreciated by those skilled in the art, implementation of the computer program instructions of the invention may be provided by any machine-readable media which can store data that is accessible by system 10, as part of or in addition to memory, including but not limited to cartridges, magnetic cassettes, flash memory cards, digital video disks, random access memories (RAMs), read-only memories (ROMs), and the like. In this regard, the system 10 is equipped to communicate with such machine-readable media in a manner well-known in the art. It will be further appreciated by those skilled in the art that the content for implementing an embodiment of the method of the invention may be provided to the system 10 from any external device capable of storing the content and communicating the content to the system 10. For example, in one embodiment, the system 10 may be connected to a network, and the content may be stored on any device in the network.

Figure 2:
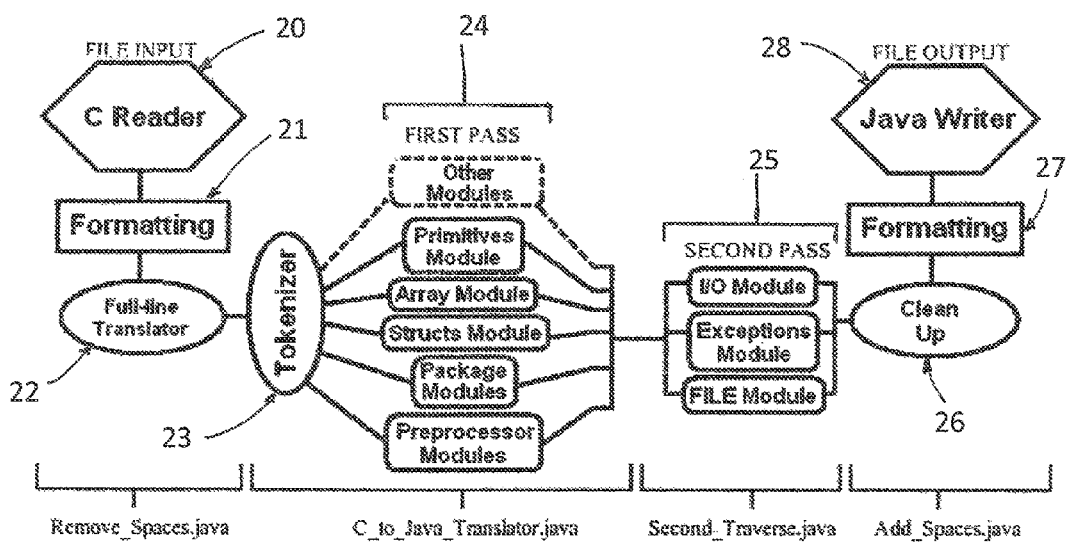
FIG. 2 depicts a process-flow diagram for the translator, illustrating the method according to an embodiment of the invention.

According to an embodiment of the invention, as shown in the process-flow diagram of FIG. 2, the program of the invention reads in text from a C file at 20, and removes unnecessary formatting such as whitespace and other programmer idiosyncrasies at 21 to provide a standardized input to the later steps in the translation process.

The program than passes the standardized input to a whole-line translator 22, where if there is a particular line of code or method in C that always has the same syntax in Java, it can be translated before the line is tokenized. For example, in C the main line is always either "int main(int argc, char*argsv[ ])" or simply "int main( )", and in Java it is always "public static void main(String[ ] args)", so if the input line is the main line, the Java main line can be printed immediately and then move on in the translation process, thereby speeding up the translation of many common methods and data structures used in both languages.

The input is then passed to tokenizer 23 which breaks up the input into tokens (e.g., groups of non-whitespace characters) for further processing.

The standardized and tokenized input is then passed to a series of individual translation modules at 24 to handle specific aspects of the program to be translated and to compartmentalize the translation process as much as possible, as described above on pages 5 and 6. The invention implements several methods of translation. In order of increasing level of complexity, they are: whole-line translation, search/replace translation, context-sensitive translation, idiomatic translation, and second-pass translation. Each line of input is passed serially through successive modules until search/replace, context-sensitive, or idiomatic translation of each type of statement or data type is completed.

The full input is then passed on to a second set of modules 25 where one or more lines of input are processed by each module using second-pass translation. Second-pass translation handles those instances when translation of a particular line correctly depends on information in another line. For example, in Java a program must throw or handle a "FileNotFoundException" if an input method tries to access a file that doesn't exist. This must be handled at the end of the method header "(public void method( ) throws Exception)". Since the translator won't know to throw an exception until and unless it reads in an input method later in the program, the invention uses a second program to handle two-pass translation, reading in lines to be translated with a primary Scanner while a secondary Scanner searches for input methods, instances of method names, or whatever else is necessary to translate two-pass statements. Second-pass translation is handled entirely by Second_Traverse, as seen in FIGS. 11 and 12, hence the name of the program.

Finally, any minor syntax errors left by previous layers of translation are removed at 26 and the resulting code is formatted to a more human-readable state at 27, reversing the de-formatting step performed at 21. The code is then written to a Java file at 28 and is ready for compilation or further coding.

FIGS. 3-6 are screen shots of a sample program before and after translation. FIG. 3 shows the first few lines of a C program, before translation; FIG. 4 shows the first few lines of a Java program, after translation; FIG. 5 shows the last few lines of a C program, before translation; and FIG. 6 shows the last few lines of a Java program, after translation. To begin, C "include" statements are translated to Java "import" statements. Most methods in C modules are translated to their Java equivalents, either using native Java methods or Java packages. In addition to specific module names being changed to their Java equivalents, the "java.util.*" package is imported automatically to cover those methods that are intrinsic to C but are package methods in Java. Next, a public class declaration is created using the name of the input file. Any variables declared with the "define" preprocessor directive are then changed to "public final static" variables. While it is not shown in this example, methods declared with the "define" preprocessor directive are rewritten as regular Java methods.

Next, arrays and other data structures that are Objects in Java are declared with the Java new syntax, and lines with more than one Object declared on one line are separated out. Method headers receive a public static to conform to Java syntax. Note that the formatting of the original file is preserved for ease of reading and better extensibility.

The opening lines of the sample program mostly use the single-pass translator. Moving to the ending lines, the two-pass translator can be seen at work. The first function of the two-pass translator is to find syntax in the translated program that would cause an Exception in Java and note the appropriate type on the header line of the method containing that syntax. In this particular program, because input/output methods are used, the "main" method throws an "IOException". Next, the C "random( )" method has been replaced with the Java "Math.random( )" method and its helper variable removed. The C "getchar( )" method has been replaced with the Java "System.in.read( )" method, and "while(1)" has been replaced with "while(true)" to conform to Java conventions.

As noted above, the invention implements several methods of translation of increasing levels of complexity, namely: whole-line translation, search/replace translation, context-sensitive translation, idiomatic translation, and second-pass translation.

The first phase of the translation, whole-line translation, is handled by the C_to_Java_Translator program as depicted in FIGS. 9 and 10. If there is a particular line of code or method in C that always has the same syntax in Java, it can be translated before the line is tokenized. For example, in C the main line is always either "int main(int argc, char*argsv[ ])" or simply "int main( )", and in Java it is always "public static void main(String[ ] args)", so if the input line is the main line, the Java main line can be printed immediately and the program moves on in the translation process.

The second step, search/replace translation, is also handled by the C_to_Java_Translator program as depicted in FIGS. 9 and 10. Everywhere a C keyword or set of keywords is seen that has an exact synonym in Java, the entire phrase is simply replaced with the corresponding Java phrase. For example, the equivalent of a Java String is represented in C by "char*", so whenever "char*" appears in C code the translator just replaces it with "String".

The next several methods are more complex. Context-sensitive translation handles Java methods that are just slightly different in C. The most obvious example is output methods. In Java, there are "println( )" methods that will output a newline character, which moves the cursor to the next line, after printing the argument, but there is no such method in C. Therefore, whenever an output method in C prints a newline character, the translator removes that character from the output string and replaces the C method with "println( )" instead of "print( )". This phase of the translation is divided between the C_to_Java_Translator program and the Second_Traverse file, based on the exact instance of this translation and whether most translations of that type take place in C_to_Java_Translator or Second_Traverse; for instance, as the majority of input- and output-related translation is handled in C_to_Java_Translator, context-sensitive translation of I/O methods takes place there, while the majority of graphics translation occurs in Second_Traverse and so context-sensitive translation between OpenGL and JOGL commands is handled there.

Idiomatic translation is somewhat similar, in that it is used when there are minor variations between C and Java syntax. This is used when the C syntax would technically work, but more "natural" Java would use a different command. For example, in C there is no equivalent to a Boolean (true/false) variable type, so integer values of 1 and 0 are used instead. While using this works in Java, it is more "idiomatically correct" to use "true" and "false" instead of "1" and "0", so when the translator reads in a line containing, say, "while(1)", it will translate this to "while(true)". This type of translation is relatively simple to recognize, and so the majority of these cases are handled within C_to_Java_Translator, as can be seen in FIGS. 9 and 10, though there are a very few cases handled by Second_Traverse.

Finally, second-pass translation handles those instances when translation of a particular line correctly depends on information in another line. For example, in Java a program must throw or handle a "FileNotFoundException" if an input method tries to access a file that doesn't exist. This must be handled at the end of the method header "(public void method( ) throws Exception)". Since the translator won't know to throw an exception until and unless it reads in an input method later in the program, the invention uses a second program to handle two-pass translation, reading in lines to be translated with a primary Scanner while a secondary Scanner searches for input methods, instances of method names, or whatever else is necessary to translate two-pass statements. Second-pass translation is handled entirely by Second_Traverse, as seen in FIGS. 11 and 12, hence the name of the program.

When the translation process begins, the name of a C program is provided to the first program, Remove_Spaces.java. This program de-formats the provided C code by removing tabs, moving block indicators, and otherwise removing programmers' idiosyncrasies to both make translation easier and to simplify the implementation of the following programs. The next program in the sequence is C_to_Java_Translator.java; this program handles several aspects of translation, as described in the preceding paragraphs and accompanying diagrams. When all translations capable of being performed on the provided C code are completed, the partially-translated C code is then passed to the third program, Second_Traverse.java, which handles the aspects of translation described above. Finally, the translated Java code is passed to Add_Spaces.java, which re-formats the code to make it more easily interpreted by human programmers, and the translated and re-formatted code is written to a Java file.

It is possible to pass a program through the above process in two ways. The first is to provide a processing script of some sort, which will automatically pass the output of one translator to the input of the next and ensure all programs are named and handled appropriately. The second is to manually pass C code through each step in the process in order to preserve the intermediate steps. In the majority of cases, one would wish to do the former, but the latter process could be useful if one wished to, for example, make manual changes to the code during translation or ensure the accuracy of each step of translation.

Although particular embodiments of the invention are illustrated and described in detail herein, it is to be understood that various changes and modifications may be made to the invention without departing from the spirit and intent of the invention as defined by the scope of the appended claims.

What is claimed is:

1. A computer-implemented method for automatically and accurately converting C programming language to Java language, comprising using a processing device to perform the steps of:
   reading in text from a C file;
   removing unnecessary formatting including, but not limited to, whitespace, to provide a standardized input to later steps in the translation process;
   performing whole-line translation of lines of code or method in C code that have the same syntax in Java;
   passing said standardized input to a tokenizer which breaks up the input into tokens for further processing;
   passing each line of standardized and tokenized input serially through successive individual translation modules to handle specific aspects of the program to be translated so as to compartmentalize the translation process for search/replace, context-sensitive, and idiomatic translation of each type of statement or data type to be translated; and
   re-formatting the translated code and writing it to a Java file.

2. A method as claimed in claim 1, including the steps of:
   performing second-pass translation prior to re-formatting to correctly translate those lines of code that depend on information in another line.

3. A method as claimed in claim 2, wherein:
   said second-pass translation includes reading in lines to be translated with a primary scanner while a secondary scanner searches for input methods, instances of method names, and other elements necessary to translate two-pass statements.

4. A method as claimed in claim 1, wherein:
   said individual translation modules include:
   a) a module for translating basic representations of data, including but not limited to text and numbers;
   b) a module for translating C preprocessor directives, including but not limited to C "include" to Java "import" and C "define" to Java final static variable declaration, respectively;
   c) a module for translating C array declarations to Java array constructors;
   d) a module for translating input and output methods or functions used to write information to a file or retrieve information from files or user input devices;
   e) a module for translating method and module headers or names of subroutines within code that are called by these names rather than being rewritten each time they are used;
   f) a module for translating most common package methods from modules containing previously-written code including but not limited to mathematical functions in math.h and text manipulation in string.h;
   g) a module for translating Can throw Exceptions such as error messages that either alert the user that there is an error or allow the program to attempt an alternate action when an error occurs;
   h) a module for translating C structs to Java inner classes to improve modularization and readability of code; and
   i) a module for translating basic graphics from OpenGL to JOGL.

5. A method as claimed in claim 1, wherein:
   different methods of translation are employed, including, in order of increasing level of complexity, whole-line translation, search/replace translation, context-sensitive translation, idiomatic translation, and second-pass translation.

6. A method as claimed in claim 5, wherein:
the search/replace translation replaces with the corresponding Java phrase the entire phrase containing a C keyword or set of keywords having an exact synonym in Java.

7. A method as claimed in claim 6, wherein:
the context sensitive translation handles C methods that are slightly different in Java, including, but not limited to, when an output method in C prints a newline character as part of the argument, the translator removes that character from the output string and replaces the C method with "println( )" instead of "print( )".

8. A method as claimed in claim 7, wherein:
the idiomatic translation translates lines where there are minor variations between C and Java syntax, including, but not limited to, translating lines in C containing integer values of "1" and "0" to the more idiomatically correct "true" and "false" in Java.

9. A method as claimed in claim 2, wherein:
any minor syntax errors left by previous layers of translation are removed following the second pass translation and prior to re-formatting.

10. A non-transitory computer storage medium comprising a computer program product stored on a computer-readable medium and executed by a processor for automatically and accurately converting C programming language to Java language, said computer program product comprising:
first instruction means for reading in text from a C file;
second instruction means for removing unnecessary formatting, including but not limited to whitespace, to provide a standardized input to later steps in the translation process;
third instruction means for performing whole-line translation of lines of code or method in C that have the same syntax in Java;
fourth instruction means for breaking up the input into tokens for further processing;
fifth instruction means for passing each line of standardized and tokenized input serially through successive individual translation modules to handle specific aspects of the program to be translated so as to compartmentalize the translation process for search/replace, context-sensitive, and idiomatic translation of each type of statement or data type to be translated;
sixth instruction means for re-formatting the translated code; and
seventh instruction means for writing the translated and re-formatted code to a Java file.

11. A computer program product as claimed in claim 10, including:
eighth instruction means for performing second-pass translation prior to re-formatting to correctly translate those lines of code that depend on information in another line.

12. A computer program product as claimed in claim 11, including:
ninth instruction means for removing any minor syntax errors left by previous layers of translation following the second pass translation and prior to re-formatting.

13. A non-transitory computer-readable medium storing computer program instructions operable to:
read in text from a C file;
remove unnecessary formatting, including whitespace, to provide a standardized input to later steps in the translation process;
perform whole-line translation of lines of code or method in C code that have the same syntax in Java;
pass said standardized input to a tokenizer which breaks up the input into tokens for further processing;
pass each line of standardized and tokenized input serially through successive individual translation modules to handle specific aspects of the program to be translated so as to compartmentalize the translation process for search/replace, context-sensitive, and idiomatic translation of each type of statement or data type to be translated;
re-format the translated code; and
write the translated and re-formatted code to a Java file.

14. A computer-readable medium as claimed in claim 13, including instructions operable to:
perform second-pass translation prior to re-formatting to correctly translate those lines of code that depend on information in another line.

15. A computer-readable medium as claimed in claim 14, including instructions operable to:
remove any minor syntax errors left by previous layers of translation following the second pass translation and prior to re-formatting.

* * * * *